(12) United States Patent
Davis et al.

(10) Patent No.: US 9,779,006 B2
(45) Date of Patent: Oct. 3, 2017

(54) NON-VOLATILE FAULT INDICATION IN A STORAGE ENCLOSURE

(71) Applicant: Xyratex Technology Limited, Havant (GB)

(72) Inventors: David M. Davis, Portsmouth (GB); Odie Killen, Colorado Springs, CO (US); Alexander C. Worrall, Waterlooville (GB)

(73) Assignee: Xyratex Technology Limited, Havant (GB)

( * ) Notice: Subject to any disclaimer, the term of this patent is extended or adjusted under 35 U.S.C. 154(b) by 47 days.

(21) Appl. No.: 14/701,219

(22) Filed: Apr. 30, 2015

(65) Prior Publication Data

US 2015/0363253 A1 Dec. 17, 2015

(30) Foreign Application Priority Data

Jun. 11, 2014 (GB) .................................. 1410434.3

(51) Int. Cl.
*G06F 11/00* (2006.01)
*G06F 11/32* (2006.01)

(52) U.S. Cl.
CPC .......... *G06F 11/327* (2013.01); *G06F 11/321* (2013.01)

(58) Field of Classification Search
CPC ......................................... G06F 11/32–11/328
USPC ........................................................... 714/57
See application file for complete search history.

(56) References Cited

U.S. PATENT DOCUMENTS

| | | | |
|---|---|---|---|
| 5,673,028 A | 9/1997 | Levy | |
| 6,114,866 A | 9/2000 | Matsuo et al. | |
| 6,476,725 B2 * | 11/2002 | Aguren | G06K 19/077 340/815.4 |
| 7,321,312 B1 | 1/2008 | Garnett | |
| 7,395,460 B2 * | 7/2008 | El-Batal | G06F 11/2221 714/42 |
| 2003/0136849 A1 | 7/2003 | Adelmann | |
| 2008/0212437 A1 | 9/2008 | Kataoka et al. | |
| 2012/0112907 A1 * | 5/2012 | Flath | G06F 13/409 340/540 |
| 2014/0131436 A1 | 5/2014 | Critchley et al. | |

\* cited by examiner

*Primary Examiner* — Joseph Kudirka
(74) *Attorney, Agent, or Firm* — Hall Estill Attorneys at Law

(57) ABSTRACT

Apparatus and method for providing a non-volatile fault indication in a multi-device storage enclosure. In some embodiments, a storage enclosure includes a plurality of storage devices housed within a storage enclosure housing. A non-volatile display element is arranged to provide a persistent display of fault information relating to a component of the storage enclosure after power is removed from the display element.

20 Claims, 7 Drawing Sheets

NON-VOLATILE FAULT INDICATION IN A STORAGE ENCLOSURE

RELATED APPLICATIONS

This application makes a claim of priority under 35 U.S.C. 119(a) to copending Patent Application No. GB 1410434.3 filed Jun. 11, 2014, the contents of which are hereby incorporated by reference.

SUMMARY

Various embodiments of the present disclosure are generally directed to an apparatus and method for providing a non-volatile fault indication in a multi-device storage enclosure.

In some embodiments, a storage enclosure includes a plurality of storage devices housed within a storage enclosure housing, and a non-volatile display element. The display element is arranged to provide a persistent display of fault information relating to a component of the storage enclosure after power is removed from the display element.

In other embodiments, a storage enclosure has a rectilinearly shaped storage enclosure housing, and a plurality of storage device carriers configured for insertion into the storage enclosure housing. Each carrier has a plurality of storage devices and a non-volatile display element which provides a persistent display of fault information relating to at least a selected one of the storage devices in the associated carrier after extraction of the associated carrier from the housing.

In other embodiments, a method includes operating a storage enclosure comprising a plurality of storage devices disposed within a storage enclosure housing; detecting a failure condition associated with a selected one of the storage devices; writing fault information to a non-volatile display element associated with the selected one of the storage devices adapted to persistently display the fault information for an indefinite period after power is removed from the display element; removing the selected one of the storage devices and the display element from the storage enclosure housing; and examining the display element after the removing step to ascertain the fault information associated with the selected one of the storage devices.

In still further embodiments, an apparatus includes a display element affixed to a carrier adapted for insertion into a storage enclosure and a monitoring circuit which writes a persistent message to the display element responsive to a fault condition of a storage device of the carrier.

These and other features and aspects of various embodiments can be understood from a review of the following detailed description and the accompanying drawings.

DETAILED DESCRIPTION

Figure 1:
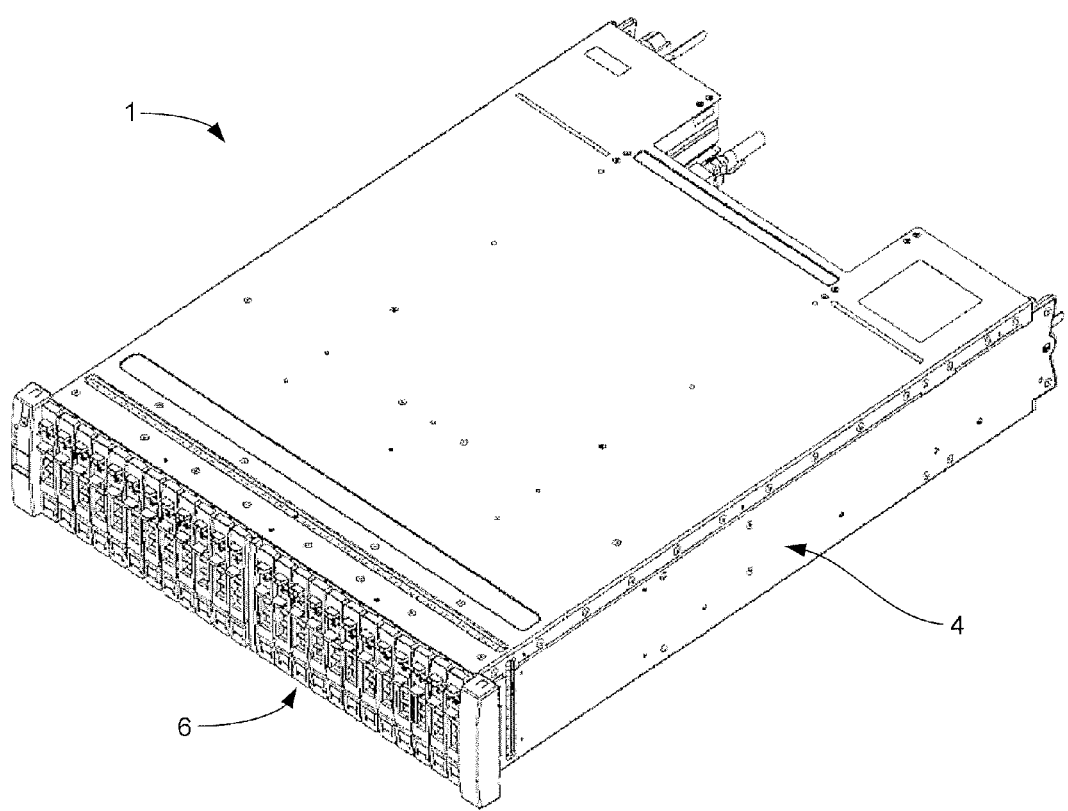
FIG. 1 illustrates a multi-device storage enclosure having a number of vertically oriented carriers in accordance with some embodiments of the present disclosure.

Various embodiments of the present disclosure are generally directed to data storage, and more particularly, to a carrier in a multi-device enclosure with non-volatile fault indication capabilities.

As the complexity of computerized data processing systems demanded by research and industry increases, so too does the amount of memory required to support such systems. The growing number of components involved in large-scale data storage makes diagnosing and repairing fault conditions associated with such components progressively more difficult. It is desirable that detailed information regarding various fault conditions be accessible so that when something does go wrong the problem can be pinpointed and resolved.

Large-scale data storage systems generally comprise storage devices such as solid state drives (SSDs) and hard disc drives (HDDs). SSDs use solid-state semiconductor memory, such as flash memory cells, to store data. HDDs use rotatable data recording media, such as magnetic recording discs, to store data. The storage devices may be held in carriers which are inserted into slots in multi-device storage enclosures. The enclosures, in turn, may be mounted into racks or cabinets to provide high density data storage systems. Each enclosure may include other active components to support the operation of the storage devices, such as controllers, thermal cooling mechanisms, power supply units (PSUs), etc.

The failure of a component within a storage enclosure, such as a controller or a storage device, can be communicated to a user by means of an indicator such as an LED that is mounted to an exterior of the storage enclosure so that it is visible externally during operation.

While operable, one limitation with such a setup is that many storage enclosure components are complex and may comprise multiple sub-modules or sub-components; for example, a controller may include a printed circuit board (PCB) with several DIMM memory slots to support local memory, one or more system on chip (SOC) or microprocessor integrated circuits (ICs), etc. Similarly, a storage carrier may house a number of SSDs or other devices, etc. In many cases where multiple components are present and one of a number fails, the failed component may not have its own indicator. The user will merely be notified that the carrier containing the component has a fault.

Once it has been established that a particular carrier has a fault it can be removed, at which point power to it is lost and the fault indicator or indicators cease to function. Separate components may then need to be tested in order to establish precisely where the fault is located before steps can be taken to replace the component or repair the fault.

Accordingly, various embodiments of the present disclosure are generally directed to a storage system with persistent fault indication capabilities. As explained below, some embodiments provide a storage enclosure which houses a plurality of storage devices within a storage enclosure housing. A non-volatile display element is arranged to provide a persistent display of fault information relating to a component of the storage enclosure after power is removed from the display element.

In some embodiments, the display element is mounted on a carrier that can be disconnected and removed from the storage enclosure. The display element may comprise an electrophoretic display which displays the fault information in a human detectable form. The display element may be monochromatic or multi-colored, and may display the fault information in any number of suitable forms including fault codes, symbols, colors, alphanumeric messages etc. In some cases, the display element is located in a first carrier and displays fault information relating to a component within that carrier. In other cases, the fault information relates to a component located in a different, second carrier.

In this way, a simple and efficient mechanism can be implemented to convey the status of components within a storage enclosure. The fault information will persist for a significant length of time after disconnection of the carrier, allowing repair operations to be carried out at a later time.

Electrophoretic displays generally operate by controlling the appearance of a screen by moving charged pigments in an electric field. Such elements are incorporated in a variety of devices such as electronic readers (e-readers) and smart phones. In such displays, light is reflected rather than absorbed by materials in the display in order to better mimic the appearance of paper.

Some electrophoretic displays sandwich a solution having small, charged titanium dioxide particles suspended in hydrocarbon oil and black pigment between two electrodes, the upper (viewing) side of which is transparent. Additional substances are added in order to prevent the particles from losing their shape and cause them to become negatively charged. When an electric field is induced between the electrodes, with the upper electrode acting as positive electrode and the lower electrode acting as a negative electrode, the white negatively charged titania particles move toward the positive electrode at the transparent upper surface and cause the area in question to appear white. When the current is reversed, particles move to the opposite pole and the pigmented oil becomes visible at the upper surface causing the area to appear black.

Other more recently developed electrophoretic displays include "electrowetting" displays (which control the behavior of a film of colored oil) and "eletrofluidic" displays (which change configuration of a colored pigment from a small reservoir to a visible layer at the viewing surface). Colored electrophoretic displays use filters or multiple colored pigments to provide multicolored images. These and other forms of non-volatile displays can be used as desired.

It is noted that electrophoretic displays tend to be bistable in that images remain, or persist, after the electric field across the electrophoretic material has been removed. In this way, the most recently displayed image recorded on the display screen will continue to persist without further application of input power. Such displays are hence non-volatile in that power is not required to maintain a display image for an indefinite period of time.

These and other features of various embodiments can be understood beginning with a review of FIG. 1 which provides an example multi-device storage enclosure 1. The enclosure 1 includes a rectilinear housing 4. SSDs are mounted in carriers 6 which are inserted in a vertical orientation into an open end of the housing 4.

The interior of the housing 4 includes a number of active components (not separately shown) to facilitate operation of the SSDs 5 including a midplane, one or more controllers, thermal cooling mechanisms, power supply units (PSUs), etc. As with the carriers 6, these components may be removable and replaceable as required. It will be understood that adaptations to systems are ongoing and that similar systems may, for example, contain carriers or components that are differently orientated and/or differently sized.

Figure 2:
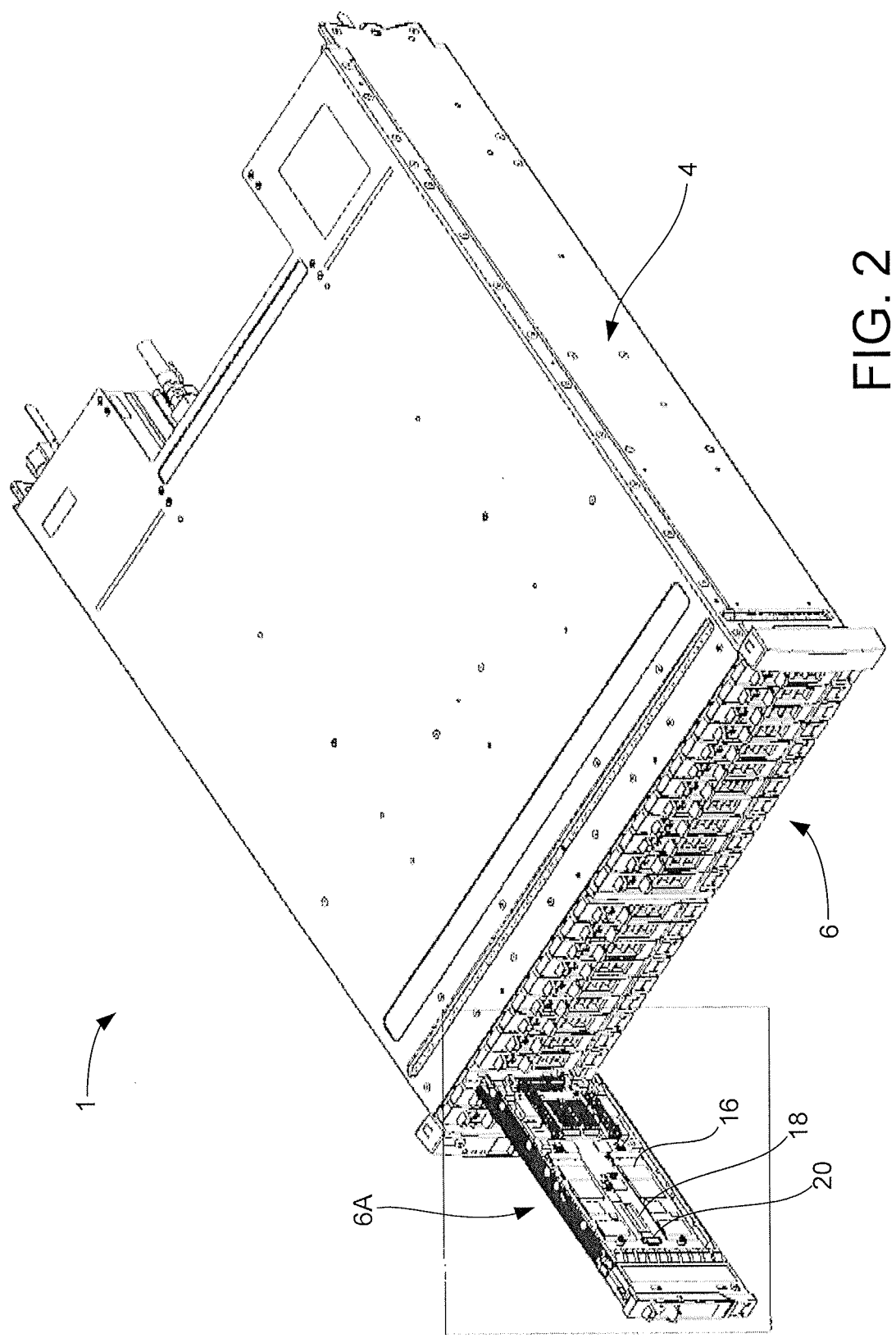
FIG. 2 shows the enclosure of FIG. 1 with an extracted carrier.

FIG. 2 shows the storage enclosure 1 from FIG. 1. A selected carrier 6A has been transitioned to an extracted position in which the carrier has been disconnected from an interior midplane (not shown) and removed from the housing 4. The carrier 6A, as with each of the remaining carriers 6, includes a storage device in the form of a solid-state drive (SSD) 16. Other forms of storage devices may be incorporated into the carriers including, but not limited to, hard disc drives (HDDs). Non-storage device elements may be incorporated into the carriers as well. In some embodiments, each carrier 6 houses an SSD and an HDD having different respective form factors.

In the event of a fault associated with a selected carrier (such as carrier 6A), an LED fault indicator (not separately denoted) on the front facing surface of the carrier will light up or change color indicating to a user which carrier contains a faulty SSD. LEDs may be mounted on the midplane or another internal location and relayed by a passive lightpipe to enable the indicator signal to be viewed externally, or the LEDs may be incorporated directly into the carriers for direct view by the user.

It will be appreciated that disconnection of the carrier to the extracted position, such as denoted by carrier 6A in FIG. 2, will disconnect the LED fault indicator so that the previously conveyed status information is no longer displayed. This is because the lightpipe is no longer connected to the LED fault indicator or because electrical power is no longer being supplied to the extracted carrier and hence, to the LED.

Figure 3:
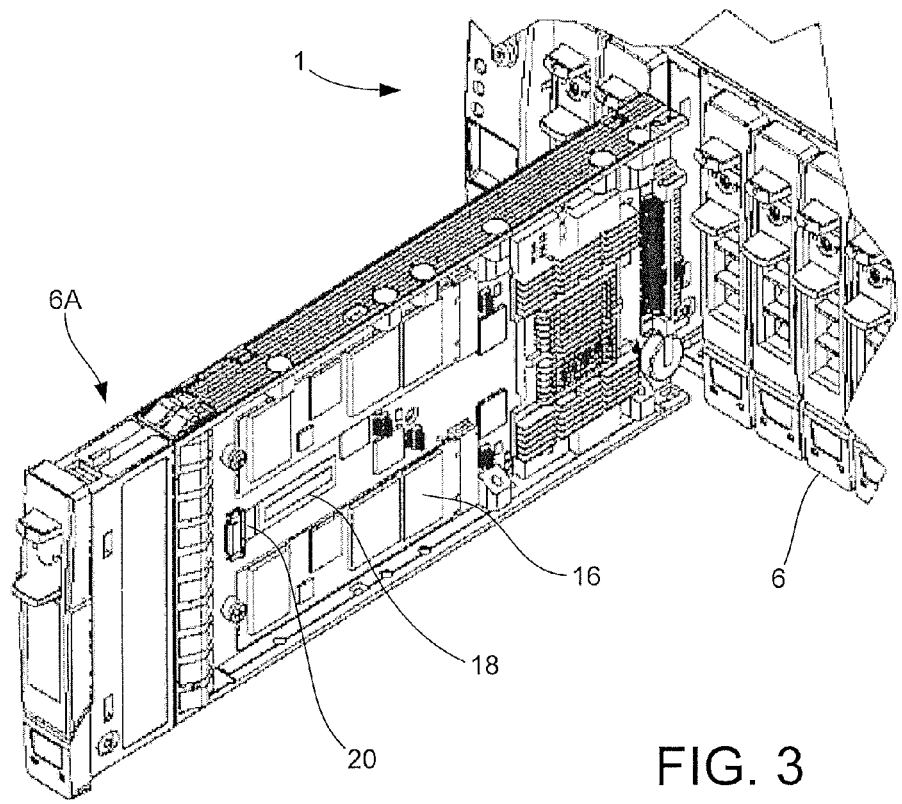
FIG. 3 shows the extracted carrier of FIG. 2 in greater detail.
Figure 4:
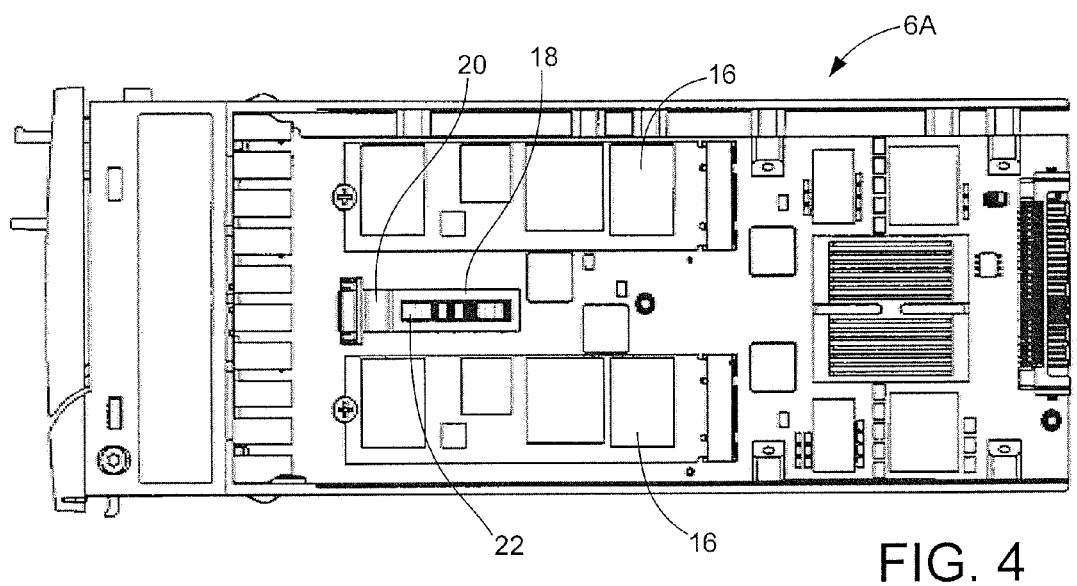
FIG. 4 is a plan view of the extracted carrier of FIGS. 2-3.

FIGS. 3-4 show the extracted carrier 6A in greater detail. An electrophoretic display element 18 is fixed to an interior surface of the carrier adjacent the SSD 16. The display element 18 can be attached temporarily or permanently to the carrier 6A using any suitable attachment mechanism, such as a clip, adhesive, etc. A flexible printed circuit (FPC) connector 20 carries control signals for the display element 18, and can be used as the attachment mechanism for the display element 18 as well.

Figure 5:
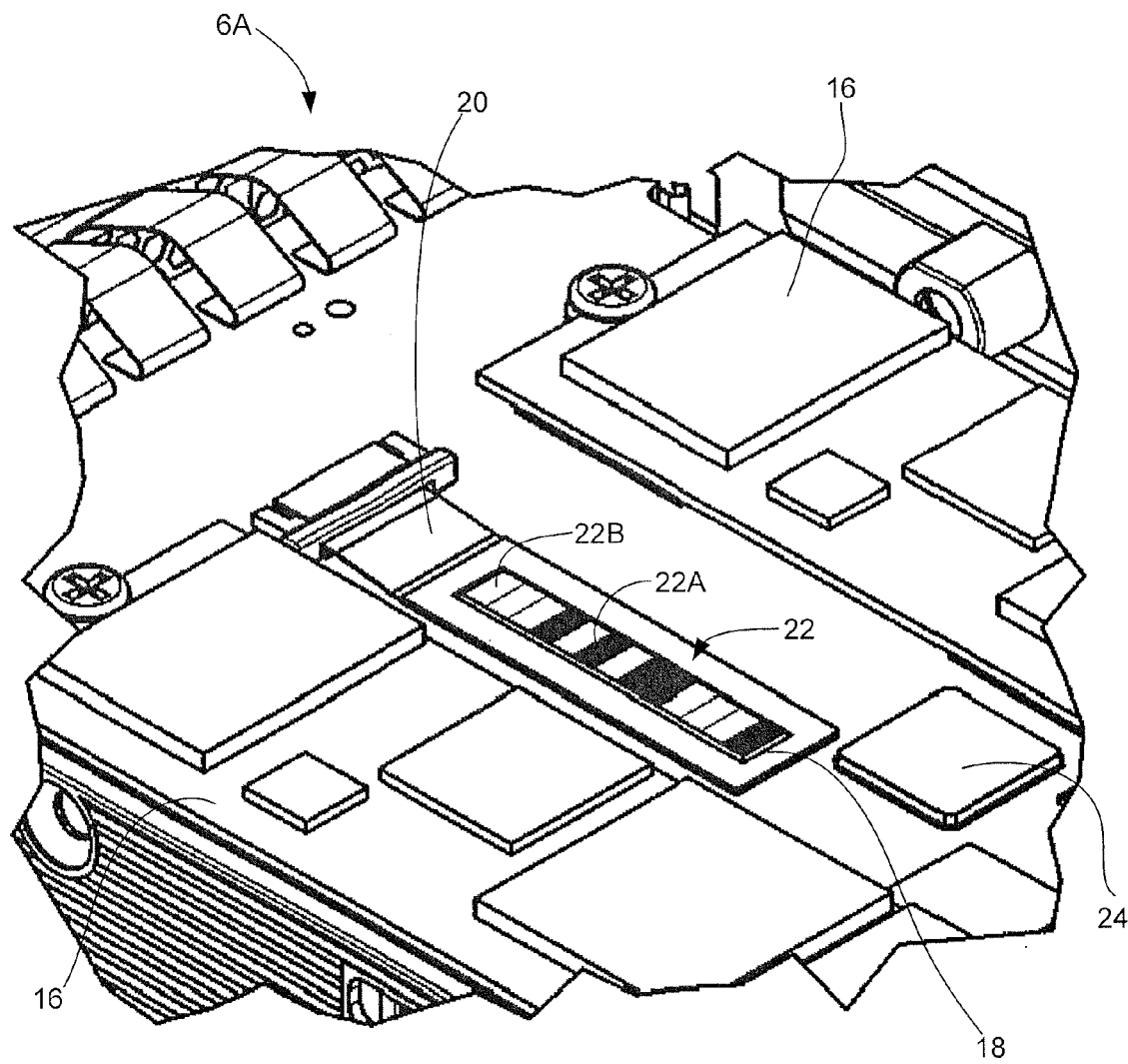
FIG. 5 illustrates a display portion of the extracted carrier of FIG. 4 in some embodiments.

As further shown in FIG. 5, the display element 18 is divided into several display portions 22. Each one of the display portions corresponds to one of the SSDs, or portions thereof, in the carrier 6A. Individual display portions 22 can also be assigned to other elements within the carrier 6A. Each display portion 22 can be independently controlled by inducing an electric field across it and changing the polarity of the electrodes to change the color of the uppermost side of the display portion. In FIG. 5, the color black is used to indicate a faulty or absent element (e.g., SSD), as denoted at 22A, and the color white indicates a normally functioning element, as denoted at 22B.

The colors can be reversed and need not necessarily be black and white, but rather can be any color so long as a distinction can be readily made between a fault condition and a normal operative condition. An appropriate monitoring and driver circuit, such as represented at 24, can be used to detect failure conditions with the various elements and provide the requisite voltages to set the individual display portions 22 accordingly. It will be noted that a pulse based driver approach can be used to set the colors of the individual display portions 22, since the display element 18 will retain the most recently written state (image).

In this way, the state of the respective elements can be written by the monitoring and driver circuit while the carrier 6A remains connected to the midplane and still receives electrical power. Once retracted, the previously recorded state will persist on the display element 18 even after electrical power has been removed from the carrier. Because of the persistive nature of the conveyed status information (fault information) from the portions 22, it is possible for a user to leave the carrier 6A for a time before repairing or to pass it to another user for repair, and the fault information will still be clearly conveyed by the display element 18.

As noted above, the use of individual portions 22 to describe the status of various elements within the carrier is merely exemplary and is not limiting. The electrophoretic display element 18 can be arranged to reflect the position of the components with which they are associated making locating faulty components easier. In other embodiments, the display element 18 can be arranged to convey the information in substantially any suitable form including codes, text, symbols, etc.

Figure 6:
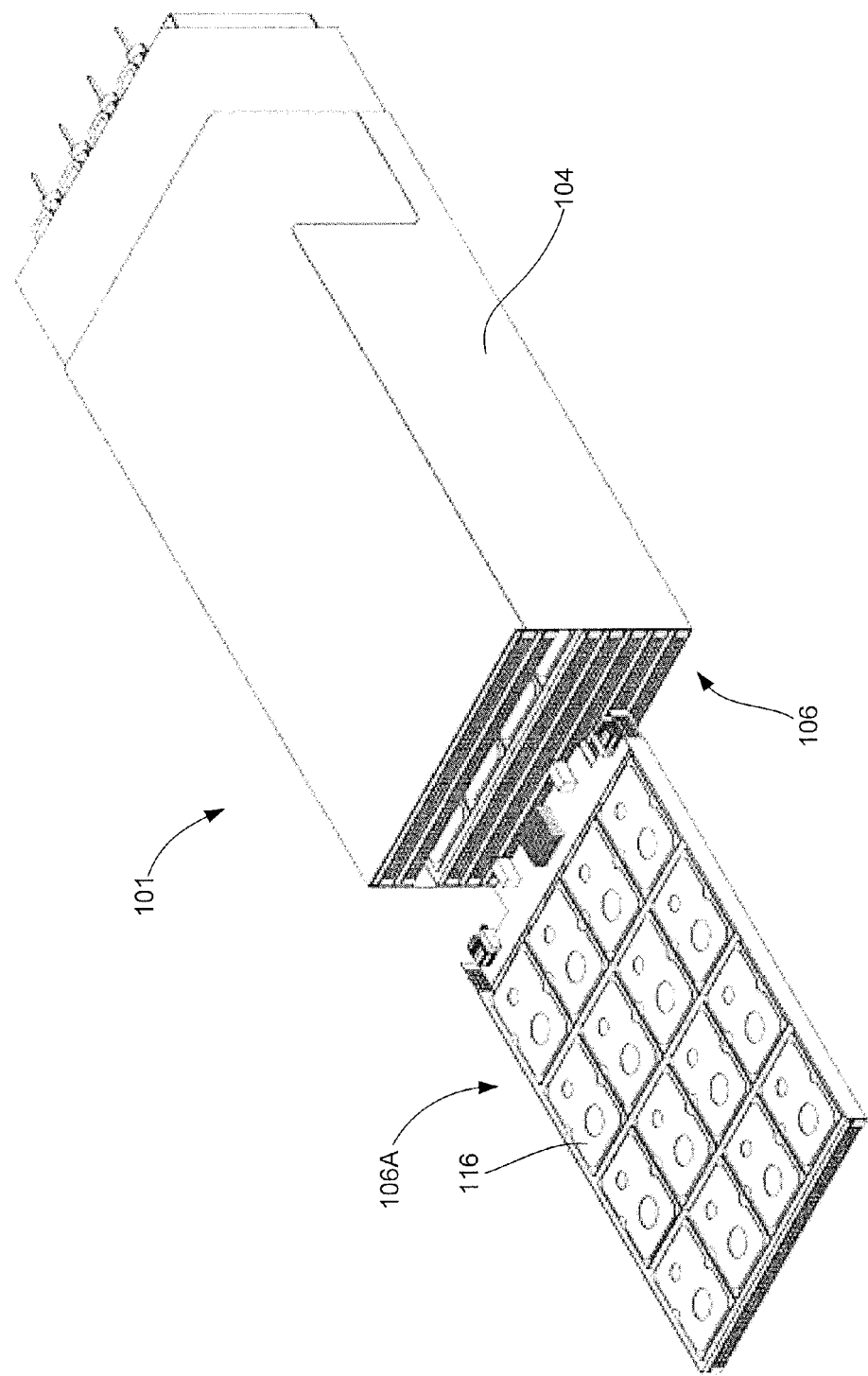
FIG. 6 illustrates another multi-device storage enclosure with a number of horizontally oriented carriers in retractable trays in accordance with further embodiments, with one tray extracted from the enclosure.

FIG. 6 illustrates another storage enclosure 101 in accordance with some embodiments. The storage enclosure includes a storage enclosure housing 104 which receives a number of carriers 106 in the form of horizontal trays which slidingly engage an open front portion of the housing 104. The exemplary storage enclosure 101 is configured to accommodate a total of eight (8) such carriers 106.

As shown by FIG. 6, a selected carrier 106A has been transitioned to an extracted position for removal from the enclosure housing 104 in a manner similar to FIG. 2 above. It can be seen that each carrier (tray) supports a total of 16 (4×4) data storage devices 116 in the form of hard disc drives (HDDs). The entire enclosure 101 supports up to 128 (4×4×8) storage devices. Other forms of devices, including but not limited to SSDs, can be supported by the respective carriers.

As before, the storage enclosure 101 incorporates a number of additional active components to support the operation of the HDDs 116 including controllers, PSUs, thermal cooling mechanisms, one or more midplanes, etc.

Figure 7:
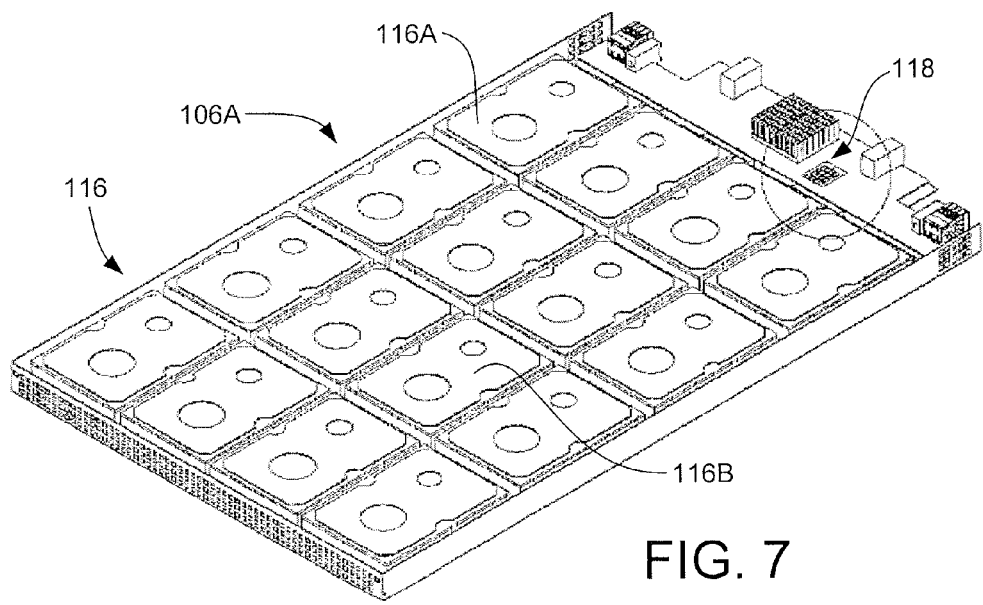
FIG. 7 shows the extracted tray from FIG. 6 in greater detail.

FIG. 7 shows an electrophoretic display element 118 in the extracted carrier 106A. A similar display element is provided in each of the carriers 106 in FIG. 6. The display element 118 is disposed toward a rear portion of the carrier 106A, but such is merely exemplary as any suitable location can be used.

Figure 8:
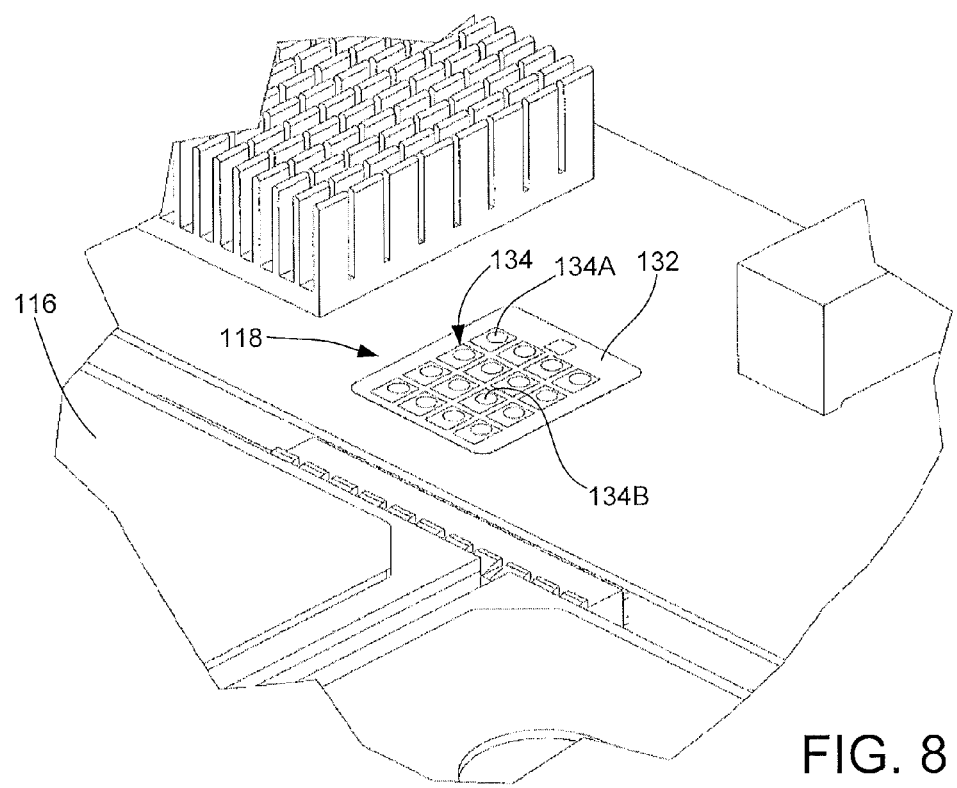
FIG. 8 illustrates a display portion of the extracted carrier of FIG. 7 in some embodiments.

The display element 118 is supported by a printed circuit board assembly (PCBA) 132, as best viewed in FIG. 8. The positioning of individual pixels 134, each of which can be controlled separately similarly to the display portions 22 in FIG. 5, corresponds to the physical layout of the HDDs 116 within the carrier 106A. For example, display pixel 134A in FIG. 8 corresponds to HDD 116A in FIG. 7, and display pixel 134B in FIG. 8 corresponds to HDD 116B in FIG. 7.

A fault within a particular carrier (tray) can be indicated by a conventional LED indicator mounted externally, at which point the electrophoretic display portion is updated so that faulty or absent HDDs (or other elements) within the tray are indicated. The tray can then be removed from the enclosure 101 and the display portion examined to identify the position of the failed component. Alternatively, displays (or display portions formed of several displays) can be located next to the respective components to which they relate.

Figure 9:
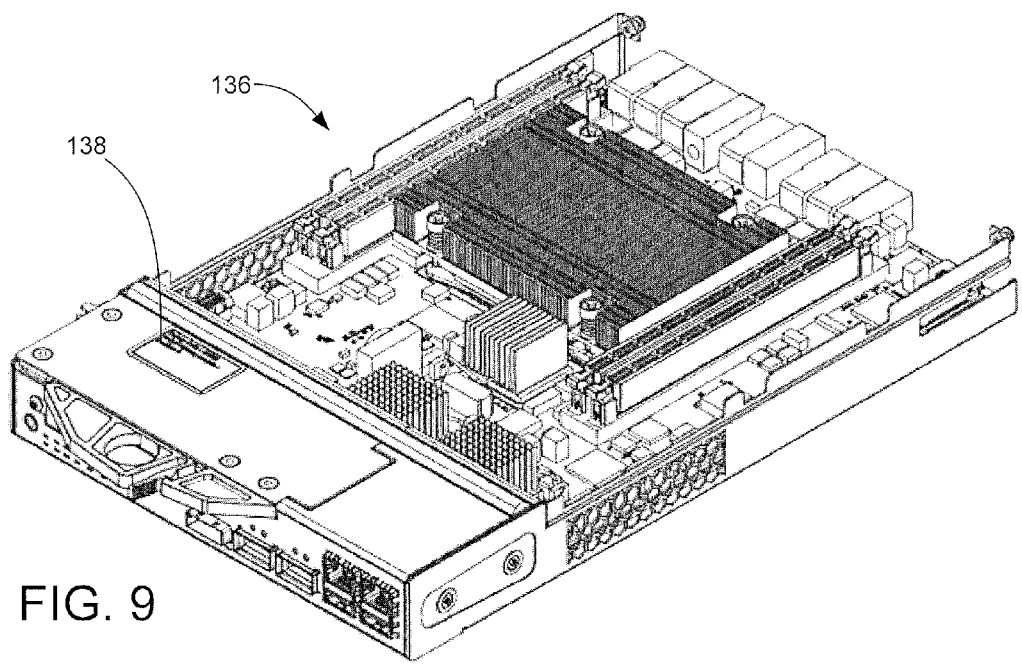
FIG. 9 depicts an application server module with a lid (cover) removed to facilitate a servicing operation in accordance with some embodiments.
Figure 10:
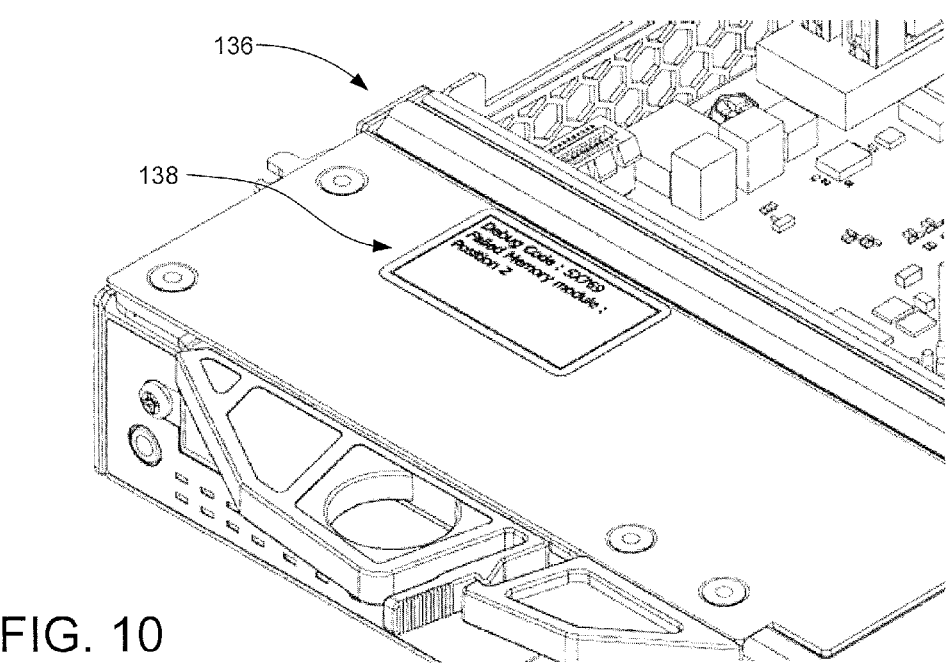
FIG. 10 illustrates a display portion of the application server module of FIG. 8 in some embodiments.

FIGS. 9 and 10 illustrate another embodiment of the present disclosure. An application server module (ASM) 136 is adapted to be incorporated into a storage enclosure, such as but not limited to the storage enclosures 1, 101 discussed above. The ASM 136 includes one or more control ICs (not separately numerically designated) to facilitate network communications with a remote device. In some cases, the ASM may correspond to a controller used in one or more of the storage enclosures 1, 101.

The ASM 136 includes an electrophoretic display element 138 to convey status information regarding the operation of the module. As shown in FIG. 10, the element 138 is arranged as an array of relatively small pixels on a display screen. Selected activation of the pixels results in a human readable alphanumeric text message made up of words, numbers and other characters as required.

In this embodiment, the information conveyed by the display element 138 enables a user to identify which components are faulty and to assist a user in diagnosing the fault. It will be appreciated that displays such as 138 can be incorporated into the carriers 6, 106 as desired, and vice versa.

It will now be appreciated that the various embodiments set forth herein provide a number of benefits. By providing a plurality of components in a storage enclosure and associated therewith a display element or a portion thereof, the status of each element can be recorded at different times to indicate whether or not a particular component of the storage system is faulty or is functioning properly. A single element will have a substantially uniform appearance since the polarity of the field that determines what color substance is visible will not tend to vary significantly within an element itself. A one to one correspondence between display elements and components is efficient in terms of both space and cost and may be sufficient if all that is required is to identify faulty components. However, if it is desired to display further information, regarding the type of fault for example, it may be necessary to have several display elements associated with each component. In this way, the set of display elements can form a pixilated screen and it is possible to present text and/or images to convey the requisite information.

In some embodiments, the display element is not generally visible to a user when the components are in use. For example, as illustrated herein the respective displays 18, 118 and 138 may be housed within the interior of the associated storage enclosure. The displays may be mounted near the components to which the displays relate. It will be appreciated that the majority of the surface area of a carrier is not usually visible when the carrier is installed and connected. Consequently, a display mounted on the carrier will generally also not be visible when the carrier is connected. This positioning is convenient and, since an external LED can be included in the system to inform the user of a fault within a carrier, viewing the display during operation is not generally required. However, in other embodiments, the displays or a portion thereof may be visible from an exterior of the enclosure, as desired.

In some embodiments, the electrophoretic displays are arranged adjacent to one another providing a compact configuration which can be easily located and provides information on the status of plural components in a carrier. In other embodiments, the electrophoretic displays are controlled so as to display alphanumeric data. Rather than simply indicating with a particular color whether or not a component is faulty, by placing displays next to each other to form a screen (each element representing a pixel on the screen) it is also possible to form words, pictures or symbols which can provide more information regarding any faults (for example the position of a faulty component or error codes for each fault).

In further embodiments, the electrophoretic displays are arranged so that their relative positions correspond to the relative positions of the associated components. This is a simple way to indicate a fault which will make it easy for a user to quickly locate the relevant component. Few displays are required and these can be mounted together at a convenient location on the carrier.

In still other embodiments, the electrophoretic displays are mounted adjacent to the associated component. This makes it easy for a user to ascertain both which component is faulty and where on the carrier this component is located. Likewise if it is desired to check the status of one component in particular this can be easily achieved.

The fault information may be updated at regular intervals. When a particular component fails, in order for this to register on the display the fault should be detected and a message sent to the display or displays associated with the component to switch the polarity of the electric field on that display or displays. This will cause its appearance of the display to change to indicate a fault on the associated component.

If a number of display portions make up a larger display for one component, field polarity may remain unchanged on some of the displays. Checks can be automated to occur at regular intervals. The user does not need to remember to update the display screen before removal of the carrier housing a faulty module. Replacement of a carrier and reattachment of power to the control circuitry can result in an automatic resetting of the display. In other embodiments, a special command can be issued to reset the display.

In some cases, the fault information can be updated in response to a user request. Updating once in response to user input is simple and if the user inputs his/her request as soon as a faulty component is detected then this reduces the possibility of a user forgetting to update the display before removing the carrier from the enclosure.

In an embodiment, the storage system comprises a system controller and fault information is updated in response to detection of a fault by the system controller. This method is efficient and the display will always be updated to indicate a faulty component before removal of the carrier.

In one aspect of the foregoing embodiments, a storage enclosure is provided having a plurality of storage devices housed within a storage enclosure housing, and a non-volatile display element arranged to provide a persistent display of fault information relating to a component of the storage enclosure after power is removed from the display element.

In another aspect of the foregoing embodiments, a method is provided with steps including operating a storage enclosure comprising a plurality of storage devices disposed within a storage enclosure housing; detecting a failure condition associated with a selected one of the storage devices; writing fault information to a non-volatile display element associated with the selected one of the storage devices adapted to persistently display the fault information for an indefinite period after power is removed from the display element; removing the selected one of the storage devices and the display element from the storage enclosure housing; and examining the display element after the removing step to ascertain the fault information associated with the selected one of the storage devices.

As used herein, terms such as "persistent" and "indefinite" will be understood consistent with the foregoing description to describe more than a transitory interval during which the fault information continues to be displayed by the associated display element after power has been removed therefrom.

Embodiments of the present disclosure have been described with particular reference to the examples illustrated. However, it will be appreciated that variations and modifications may be made to the examples described within the scope of the present disclosure.

What is claimed is:

1. A storage enclosure comprising:
   a plurality of storage devices housed within a storage enclosure housing;
   a non-volatile display element arranged to provide a persistent display of fault information relating to a component of the storage enclosure after power is removed from the display element; and
   a powered failure indicator which provides a second display of fault information associated with the component of the storage enclosure, the second display of fault information terminating upon the removal of power from the display element.

2. The storage enclosure of claim 1, wherein the display element is an electrophoretic display element.

3. The storage enclosure of claim 1, wherein the display element is mounted on a carrier that is capable of being disconnected and removed from the storage enclosure housing, wherein the fault information continues to be displayed by the display element after the carrier is disconnected and removed from the storage enclosure housing.

4. The storage enclosure of claim 3, wherein the display element is written to display the fault information while the carrier remains operationally connected to the storage enclosure housing and the fault information continues to be displayed by the display after the carrier is disconnected and removed from the storage enclosure housing.

5. The storage enclosure of claim 1, wherein, prior to the removal of power from the display element, the second display of fault information is visible from an exterior of the storage enclosure and the persistent display of fault information is not visible from the exterior of the storage enclosure.

6. The storage enclosure of claim 1, wherein the powered failure indicator comprises a light emitting diode (LED).

7. The storage enclosure of claim 1, further comprising a monitoring and driver circuit adapted to detect a failure condition associated with the component and provide requisite voltages to the display element to provide the persistent display of the fault information, wherein the persistent display of the fault information continues indefinitely after removal of power from the display and from the monitoring and driver circuit.

8. The storage enclosure of claim 1, wherein the component of the storage enclosure is a selected one of the plurality of storage devices.

9. The storage enclosure of claim 1, wherein the display element comprises a plurality of portions, each portion associated with a different one of the plurality of storage devices.

10. The storage enclosure of claim 9, wherein the plurality of storage devices are arranged as an array in a carrier that is capable of being inserted and removed from the storage enclosure housing, and the portions of the display element are arranged in a corresponding array such that a location of a mark in a selected one of the plurality of portions indicates a corresponding location of a failed storage device in the array of storage devices in the carrier.

11. The storage enclosure of claim 1, wherein the persistent display of fault information is arranged in a form of alphanumeric data.

12. A storage carrier comprising:
   a carrier housing adapted for insertion into a storage enclosure;
   a plurality of storage devices supported by the carrier housing; and
   a non-volatile display element coupled to the carrier housing configured to provide a persistent display of fault information relating to the storage devices after extraction of the storage carrier from the storage enclosure, the non-volatile display element further configured to automatically terminate the persistent display of fault information responsive to reinsertion of the storage carrier into the storage enclosure.

13. The storage carrier of claim 12, wherein the display element is an electrophoretic display element.

14. The storage carrier of claim 12, further comprising a powered failure indicator which provides a second display of fault information associated with the storage carrier while the storage carrier remains connected to the storage enclosure, wherein the second display of fault information terminates upon extraction of the storage carrier from the storage enclosure.

15. A method comprising:
   operating a storage enclosure comprising a plurality of storage devices disposed within a storage enclosure housing;
   detecting a failure condition associated with a selected one of the storage devices;
   writing fault information to a non-volatile display element associated with the selected one of the storage devices adapted to persistently display the fault information for an indefinite period after power is removed from the non-volatile display element;
   using a volatile display element to provide a second indication of the failure condition associated with the selected one of the storage devices; and
   removing the selected one of the storage devices and the non-volatile display element from the storage enclosure housing, the second indication terminating responsive to the removing step.

16. The method of claim 15, wherein the display element is an electrophoretic display element to which the fault information is written for display thereon prior to the removing step.

17. The method of claim 15, wherein the storage devices are characterized as hard disc drives (HDDs), and a location of a mark within the display element identifies a location of the selected one of the HDDs with which the failure condition is associated.

18. The method of claim 15, wherein the volatile display element is coupled to the storage enclosure housing to provide the second fault indication external to the storage enclosure housing adjacent the selected one of the storage devices.

19. An apparatus comprising a display element affixed to a carrier adapted for insertion into a storage enclosure and a monitoring circuit which writes a persistent message to the display element responsive to a fault condition of a storage device of the carrier, the persistent message remaining displayed on the display element after removal of electrical power from the carrier, the persistent message automatically clearing responsive to subsequent reapplication of electrical power to the carrier.

20. The apparatus of claim 19, wherein the display element is an electrophoretic display element to which the persistent message is written by the monitoring circuit prior to extraction of the carrier from the storage enclosure, wherein the electrical power is removed by extraction of the carrier from the storage enclosure and reapplied responsive to subsequent insertion of the carrier into the storage enclosure.

* * * * *